United States Patent [19]

Brothers

[11] Patent Number: 5,080,027
[45] Date of Patent: Jan. 14, 1992

[54] SEED PLANTER GROUND HOLE MANUAL TOOL

[76] Inventor: John H. Brothers, R.D. 2, Box 1012, Felton, Del. 19943

[21] Appl. No.: 600,625

[22] Filed: Oct. 22, 1990

[51] Int. Cl.⁵ .............................................. A01C 5/02
[52] U.S. Cl. ...................................... 111/99; 111/115
[58] Field of Search .................. 111/115, 7.1, 89, 99, 111/92, 98; 73/784; 175/19; 172/371; 294/59, 60

[56] References Cited

U.S. PATENT DOCUMENTS

| | | | |
|---|---|---|---|
| D. 269,844 | 7/1983 | Hackerson | 111/99 X |
| 318,601 | 5/1885 | Cronk | 111/99 |
| 1,498,628 | 6/1924 | Herr | 111/99 |
| 1,856,809 | 5/1932 | Gibson et al. | 111/92 |
| 2,207,741 | 7/1940 | Kimble | 111/99 |
| 3,107,638 | 10/1963 | Johnston | 111/7.1 |
| 3,326,306 | 6/1967 | Weir | 111/71.1 X |
| 3,722,604 | 3/1973 | Lesher | 111/99 X |

FOREIGN PATENT DOCUMENTS

| | | | |
|---|---|---|---|
| 235722 | 4/1945 | Fed. Rep. of Germany | 111/99 |
| 195903 | 5/1890 | France | 111/99 |
| 71457 | 8/1947 | Norway | 111/7.1 |
| 20696 | of 1909 | United Kingdom | 111/99 |

Primary Examiner—Dennis L. Taylor
Assistant Examiner—Jeffrey L. Thompson
Attorney, Agent, or Firm—Warren H. Kintzinger

[57] ABSTRACT

A hard material pointed bottom tool is presented having a top handle and a stand-on side extension enabling body weight through a user's foot to drive the pointed bottom end into the ground for repeatedly providing seed receiving planting holes. The stand-on side extension also serves as a depth limiting gauge for the tool driven ground seed planting holes. An additional refigurement includes lower bottom thread- on pointed ends replaceable as desired with ends of different lengths for seed planting hole depth suitable to the seeds being planted and, in addition, having bottom replaceable ends of different harder material such as tempered steel in place of other material in the balance of the tool.

4 Claims, 1 Drawing Sheet

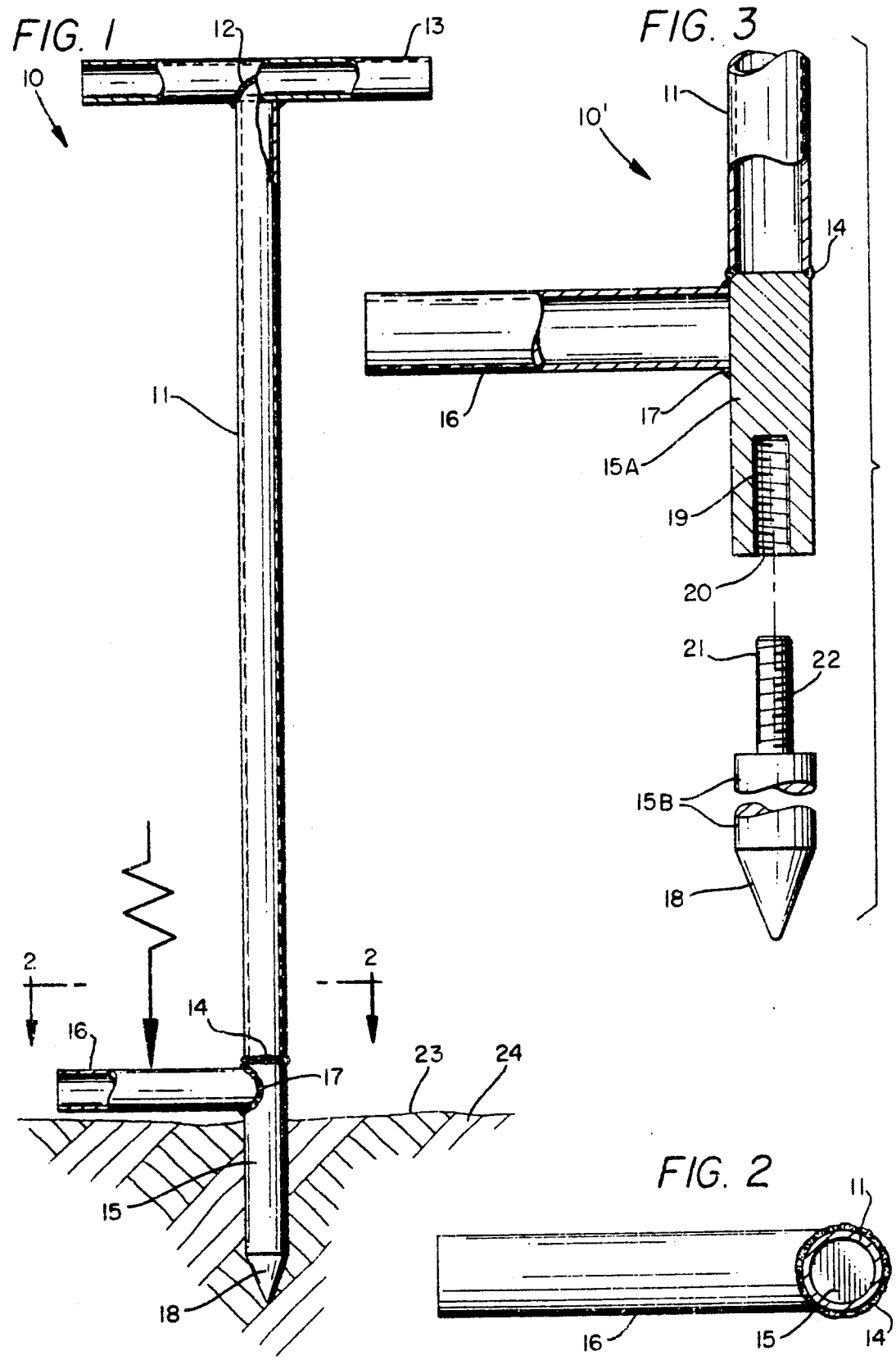

SEED PLANTER GROUND HOLE MANUAL TOOL

This invention relates in general to ground seed planting hole digging or creating devices, and more particularly, to a seed planter ground hole creating easy to use manual tool.

Hand digging of seed planting holes can be a laborious time consuming task particularly where many planting holes are needed running to hundreds, even thousands of holes in a garden for the planting desired. The number of holes coupled with depth of seed planting is an important significant factor with many seeds. With soil depth being many times a significant consideration varying with different seeds along with soil condition also being a contributing factor uniform optimum seed planting depth is important. It is important that any manual tool provided for creating seed planting holes in soil be light easy to use, have a long service life, and be capable of providing uniform depth seed planting holes in soil. Further, it is important to be able to adapt the tool for creating seed planting holes of desired depth while at the same time being a relatively inexpensive tool at the store.

It is, therefore, a principal object of this invention to provide a manual seed planter ground hole creating tool that is easy to use.

Another object is to provide such a seed planter ground hole creating tool that enables the providing of substantially uniform depth seed planting holes.

A further object is to provide such a seed planter ground hole creating tool that is a relatively inexpensive tool.

Still another object is to provide such a seed planting hole creating tool that is adaptable to providing seed planting holes matched to the optimum planting depth of particular seeds being planted in a garden.

Features of the invention useful in accomplishing the above objects include, in a seed planter ground hole creating manual tool, a hard material pointed bottom tool with a top handle and a stand-on side extension enabling body weight through a user's foot to drive the pointed bottom end into the ground for repeatedly providing seed receiving planting holes. The stand-on side extension also serves as a depth limiting gauge for the tool driven ground seed planting holes. An additional refinement includes lower bottom thread-on pointed ends replaceable as desired with ends of different lengths for seed planting hole depth suitable to the seeds or even small plants being planted and, in addition, having bottom replaceable ends of different harder material such as tempered steel in place of other material in the balance of the tool.

Specific embodiments representing what are presently regarded as the best modes of carrying out the invention are illustrated in the accompanying drawing.

In the drawing:

FIG. 1 represents a partially broken away and sectioned side elevation view of the seed planter ground hole creating manual tool;

FIG. 2, a partial detail view taken along line 2—2 of FIG. 1; and

FIG. 3, a partially broken away and sectioned side elevation view of another seed planter ground hole creating manual tool.

Referring to the drawing:

The seed planter ground hole pressing manual tool 10 is shown in FIGS. 1 and 2 to have a tubular shank 11 approximately three feet long welded 12 at the top to tubular "T" handle 13 and welded 14 to the bottom ground entry member 15. A stand-on tubular side extension 16 is welded 17 on the side of the top portion of the bottom ground entry member 15 that has a pointed lower end 18 for ease of repeated entry into ground soil pressing seed planting holes quickly and easily.

With the alternate embodiment of FIG. 3 the bottom ground entry member 15 of the FIGS. 1 and 2 is replaced with upper members 15A connected to the tubular shank 11 and to the tubular side extension 16 in the same manner, and a lower ground entry member 15B that has a pointed lower end 18 for ease of ground entry. The upper member 15A has an internally threaded 19 opening 20 into which the threaded 21 extension 22 of member 15B is tightened. This facilitates the mounting of specially heat treated or hard metal alloy members 15B to be mounted on the bottom of the tool 10'. Further, members 15B of different lengths may be mounted on the tool suited to desired hole depth for seeds or small plants being planted. The stand-on tubular side extensions 16 of both embodiments limit lower pointed end 18 penetration into the soil by coming into contact with the surface 23 of the earth 24.

Typical size measurements for the seed planter ground hole creating manual tool 10 of FIGS. 1 and 2 are the handle 13 eleven inches long and approximately one and one quarter inches in diameter, the same diameter as the tubular shank and the tubular side extension, length of the tubular shank 11 from the handle 13 to the stand-on tubular side extension 16 almost three feet. The tubular side extension 16 is four and one half inches long and the bottom ground entry member 15 from the bottom of the side extension 16 to the pointed lower end five and one half inches long. It should also be noted that a tool user does not have to always press the tool 10 down to the extent that the bottom of the stand-on tubular side extension 16 comes into contact with the top of the soil with the experienced user being able to gauge tool insertion depth uniformly to a reasonable degree of accuracy.

Whereas this invention has been described with respect to two embodiments thereof, it should be realized that various changes may be made without departure from the essential contributions to the art made by the teachings hereof.

I claim:

1. A planter ground hole creating manual tool comprising: a manually operated tool having a tubular upwardly extended shank; a "T" type handle fastened to the top of said tubular upwardly extended shank; bottom ground entry means fastened to the lower end of said tubular upwardly extended shank; said bottom ground entry means having a pointed lower end for ease of ground soil penetration; stand-on side extension means fastened to the side of said bottom ground entry means; both said "T" type handle and said stand-on side extension means being hollow metal tube sections fastened by welding connections; said "T" type handle being spaced approximately three feet above said stand-on side extension means; said bottom ground entry means formed of solid metal and being welded to the bottom end of said tubular upwardly extended shank as an extension thereof and having a pointed lower end; said bottom ground entry means having an upper member and a lower member with interconnect means between said upper and lower members; said interconnect means between said upper and lower members comprising a threaded opening and threaded extension connection; and wherein different length lower members are provided which are interchangeably mounted on said upper member and are each suited to create a selected hole depths for seeds or small plants being planted.

2. The planter ground hole creating manual tool of claim 1, wherein said lower members are hardened metal members.

3. The planter ground hole creating manual tool of claim 1, wherein said threaded opening is in said upper member and said threaded extension is on the top of said lower members.

4. The planter ground hole creating manual tool of claim 1, wherein said handle is approximately eleven inches long and approximately one and one quarter inches in diameter; said tubular shank and said stand-on side extension means are approximately one and one quarter inches in diameter; said stand-on side extension means is approximately four and one half inches long; and said bottom ground entry means from the bottom of said stand-on side extension means to the pointed lower end of a selected lower member approximately five and one half inches long.

* * * * *